UNITED STATES PATENT OFFICE.

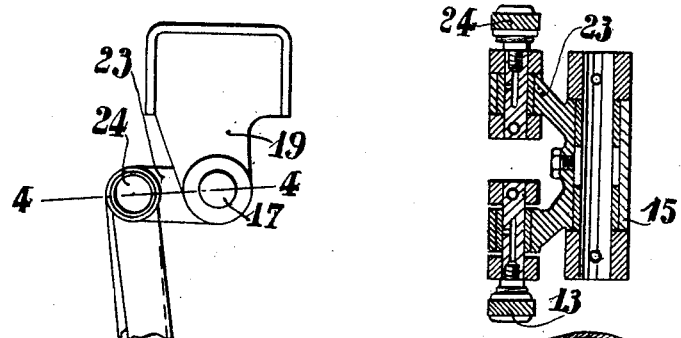
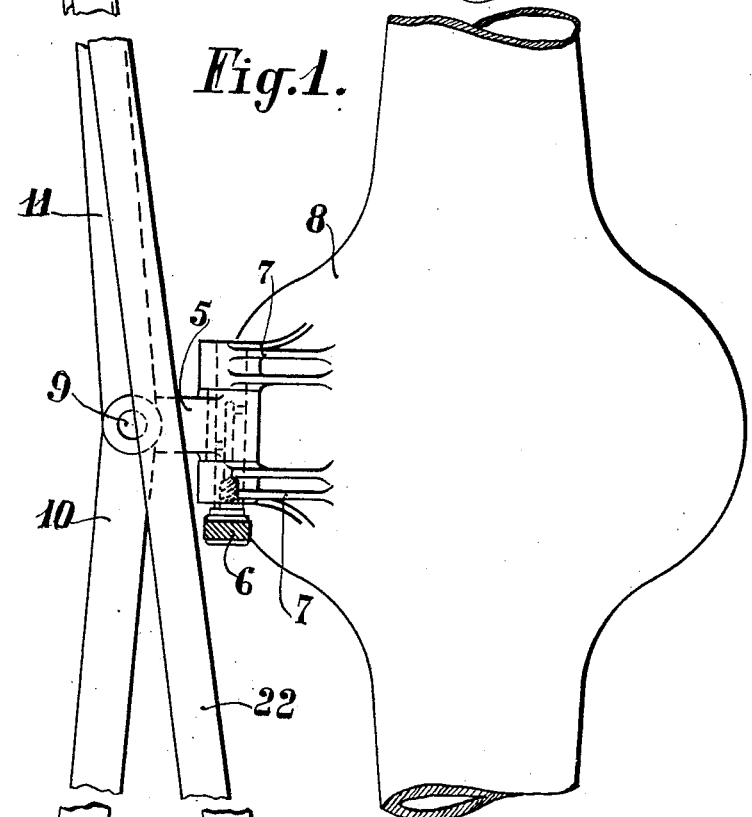
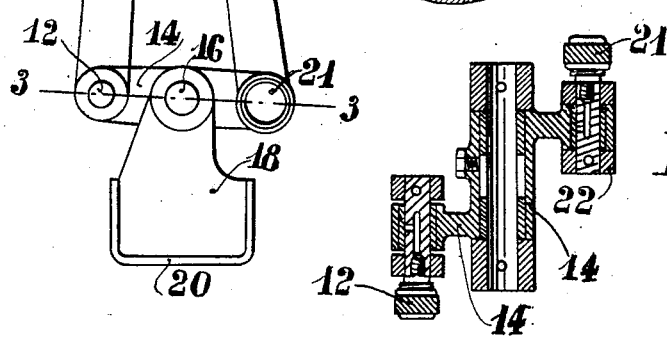

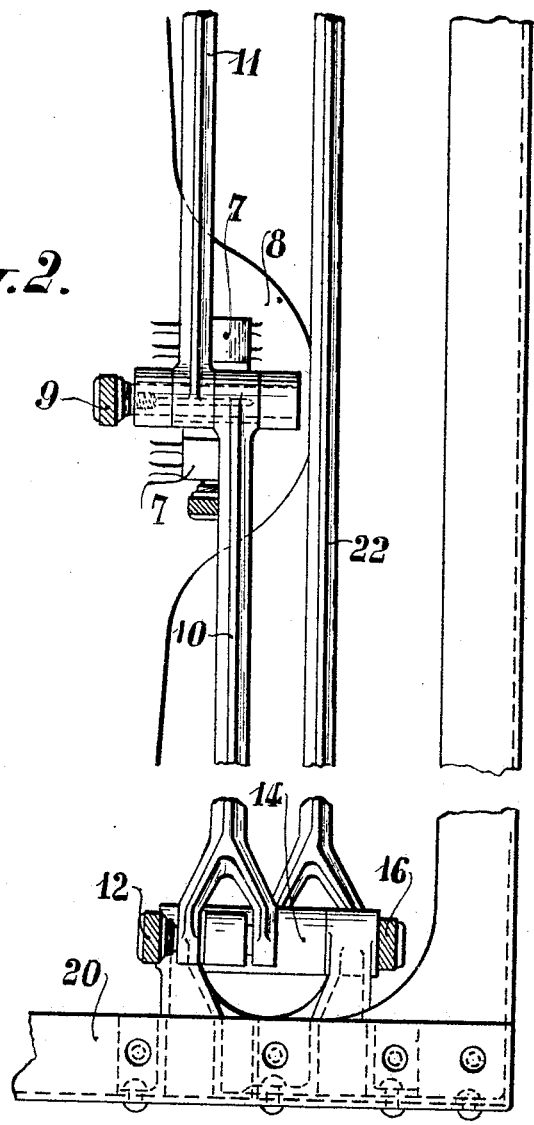

ARTHUR DE CONINCK, OF BRUSSELS, BELGIUM.

STABILIZING DEVICE FOR AUTOMOBILE UNDERFRAMES.

1,404,585.  Specification of Letters Patent.  Patented Jan. 24, 1922.

Application filed June 10, 1920. Serial No. 388,054.

*To all whom it may concern:*

Be it known that I, ARTHUR DE CONINCK, a subject of the King of Belgium, residing at 43$^a$ Rue des Aduatiques, Brussels, Belgium, have invented new and useful improved Stabilizing Devices for Automobile Underframes (for which I have filed applications in Belgium, Feb. 8, 1919; Great Britain, Feb. 5, 1919; France, March 13, 1919.)

Arrangements usually provided, for the suspension of the underframe to the axles of an automobile vehicle, present in particular the disadvantage of allowing the underframes to take up, when travelling, a movement known as "rolling," occasioning continual lateral displacements with respect to the said axles.

This transverse oscillatory motion, which is particularly disagreeable to the passengers, seems to be mainly due to the fact that, when travelling, in consequence of the inequalities of the road, the plane of the underframe does not remain parallel to the axle and moves too far away from the parallel position, sometimes in one direction and sometimes in the opposite direction.

The above mentioned motion of the underframe in relation to the axle is chiefly noticeable at the back and it also has the result of causing excessive wear of the shackles and also of the other joint members of the suspension springs by occasioning lateral displacements of the underframe with respect to the axle.

With a view to maintaining better parallelism between the axle and the plane of the underframe and to preventing the above mentioned rolling motion it has already been suggested to connect the two longitudinal bearers of the underframe directly to the middle of the back axle by means of transverse connecting rods, which are respectively jointed by pivots at each end of a rocking lever or whiffle-tree which is itself pivoted to a central projection on the axle.

The means thus recommended certainly diminishes the transverse oscillations of the underframe but only to a very incomplete extent and it has the disadvantage of subjecting the joint connecting rods to bending moments and torques which hamper the working of the whole.

The stabilizing device forming the subject-matter of the present invention enables this condition to be remedied.

One constructional form of it is indicated by way of example in the accompanying drawing in which:—

Figure 1 is a vertical elevation showing the device connecting the two longitudinal bearers of an underframe with the central portion of the back axle.

Figure 2 is a plan of the preceding.

Figure 3 is a detail section on the line 3—3 in Figure 1, and

Figure 4 is a similar section to the last, but on the line 4—4 in Figure 1.

Referring to the above mentioned figures, 5 designates a housing jointed by means of a pivot 6 to two lugs 7 on the back axle 8. In the fork of this housing are jointed on a common pivot 9 an extremity of each of the two connecting rods 10 and 11, the opposite ends of which are respectively connected by pivots 12 and 13 to the arms of two levers 14 and 15 which are themselves pivoted at 16 and 17 on projections 18 and 19, virtually integral with the longitudinal bearers of the underframe 20.

The second arm of the swingle-tree lever 14 is jointed by a pivot 21 to a connecting rod 22 the opposite extremity of which is jointed to the second arm 23 of the lever 15 by a pivot 24.

When the axle 8 tends to assume an inclined position with respect to the chassis 20, (for instance, if the left end of the axle 8 tends to approach the left horizontal beam of the chassis 20—Fig. 1) the pivot 9 tends to be displaced towards the right and consequently the rod 11 pushes the lever 23 towards the right.

This lever therefore exerts attraction on the rod 22 and the said rod acts on the oscillating lever 14 so its upper arm is inclined towards the left by exerting attraction on the rod 10. This rod 10 which is articulated at the pivot 9 exerts on this pivot an effect of attraction towards the left.

When the axle tends to incline and to tip the pivot 9 towards the right side, the rod 10 acting as it has been said, tends to return the pivot 9 towards the left. Consequently the longitudinal axis of the pivot 9 remains always in the vertical axial plane of the chassis 20.

By reason of this fact the horizontal plane of the chassis 20 always remains parallel to the longitudinal axis of the axle 8 in view of the bending of the usual springs of suspension (not shown) which connect the chassis 20 with the axle 8.

Thus, upon bending of the suspension springs during travel of the automobile, the chassis 20 remains always parallel to the axle 8 and the said movement of "rolling" is prevented.

As the axle must be able to be displaced longitudinally with respect to the chassis, the pivot 9 is not directly provided on the axle; the pivot 9 is integral with the piece 5 which is mounted on a pivot between two ears integral with the axle 8.

What I claim is:

1. A stabilizing device for obviating the rolling motion and the successive lateral displacements of the underframe with respect to the axle in automobile vehicles, the said device consisting of two transverse connecting rods jointed to a common housing which is pivoted to a central lug on the back axle, the said connecting rods being respectively connected to the arm of a lever pivoting on a lug fixed to each longitudinal bearer of the underframe, one of these levers having its second arm parallel to the first while the other has its second arm in alignment with the first, and these two second arms are connected directly by a third transverse connecting rod.

2. In combination with an automobile vehicle axle and frame, an element connected to the center of the axle, a pair of oppositely extending rods having their inner ends pivotally connected to said element, elements pivotally connected to opposite sides of said frame and having upwardly extending arms, one of said elements also having a downwardly extending arm, the said rods having their outer ends pivotally connected to two of said upwardly extending arms, and a third rod having one end pivotally connected to the other upwardly extending arm and the other end pivotally connected to said downwardly extending arm.

In testimony whereof I affix my signature in presence of two witnesses.

ARTHUR DE CONINCK.

Witnesses:
L. P. ALETTLE,
F. BALECOS.